United States Patent
Hegler

(10) Patent No.: US 6,773,253 B2
(45) Date of Patent: Aug. 10, 2004

(54) DEVICE FOR PRODUCING PROFILED TUBES CONSISTING OF SYNTHETIC MATERIAL

(76) Inventor: Ralph Peter Hegler, Schillerstrasse 7, D-97688 Bad Kissingen (DE)

( * ) Notice: Subject to any disclaimer, the term of this patent is extended or adjusted under 35 U.S.C. 154(b) by 111 days.

(21) Appl. No.: 10/182,544

(22) PCT Filed: Jan. 17, 2001

(86) PCT No.: PCT/EP01/00464

§ 371 (c)(1),
(2), (4) Date: Jul. 25, 2002

(87) PCT Pub. No.: WO01/58669

PCT Pub. Date: Aug. 16, 2001

(65) Prior Publication Data

US 2003/0003181 A1 Jan. 2, 2003

(30) Foreign Application Priority Data

Feb. 12, 2000 (DE) .......................................... 100 06 380

(51) Int. Cl.[7] .............................................. B29C 53/30
(52) U.S. Cl. .................... 425/186; 425/326.1; 425/336; 425/369; 425/392; 425/396
(58) Field of Search ................................ 425/182, 185, 425/186, 336, 326.1, 369, 388, 392, 395, 396, 371

(56) References Cited

U.S. PATENT DOCUMENTS

| | | | |
|---|---|---|---|
| 4,492,551 A | * | 1/1985 | Hegler et al. ............ 425/326.1 |
| 5,489,201 A | | 2/1996 | Berns et al. |
| 5,693,347 A | * | 12/1997 | Hegler ...................... 425/233 |

FOREIGN PATENT DOCUMENTS

| | | |
|---|---|---|
| DE | 31 20480 A1 | 5/1981 |
| DE | 197 00 028 A1 | 1/1997 |
| EP | 0679498 A1 | 4/1995 |
| EP | 0 764 519 A1 | 9/1996 |

\* cited by examiner

*Primary Examiner*—Robert Davis
*Assistant Examiner*—Thu Khanh T. Nguyen
(74) *Attorney, Agent, or Firm*—James B. Conte; Barnes & Thornburg

(57) ABSTRACT

An apparatus for the manufacture of profiled plastic pipes comprises a machine bed (1) that half shells (2, 2') are guided on, forming a molding path (9). A driving pinion (17) is provided above the molding path (9). At least one lower driving pinion (41) is provided on the machine bed (1) along the molding path (9). A lower indentation (39, 39') is formed in the area of the lower side (30, 30') of the half shells (2, 2'), with the at least one lower driving pinion (41, 41') engaging therewith.

6 Claims, 3 Drawing Sheets

DEVICE FOR PRODUCING PROFILED TUBES CONSISTING OF SYNTHETIC MATERIAL

Figure 1:
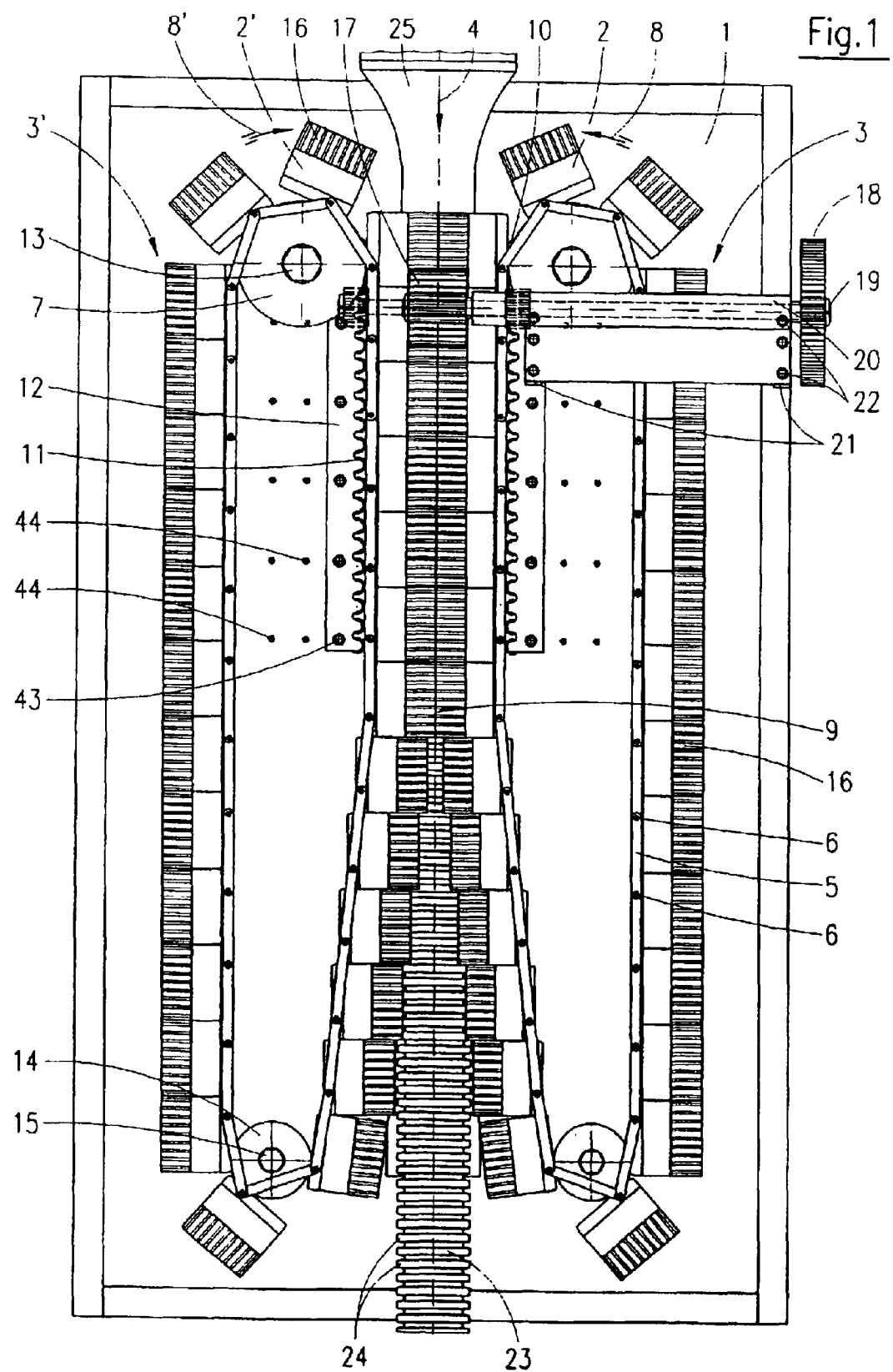

The invention relates to an apparatus for the manufacture of profiled plastic pipes.

In an apparatus of the generic type known from DE 31 20 480 A1 (corresponding to U.S. Pat. No. 4,492,551), actuation of the half shells, which combine in pairs to form a mold, takes place on the molding path by means of an upper driving pinion engaging with an indentation on the upper side of each half shell. Vacuum suction takes place via vacuum connections on the upper side of the machine bed which overlap vacuum channels at the beginning of the molding path; the vacuum channels are formed in the half shells. Equally, cooling water inlet lines and cooling water outlet lines discharge into the upper side of the machine bed, overlapping cooling water channels on the molding path which are formed in the half shells and discharge on the lower side of the half shells. It is essential that flat-spread and tight engagement exists between the sliding surface of the machine table, in particular in the area of the molding path, and the lower sides of the half shells, so that there is no vacuum loss in particular due to the fact that the air is sucked off between the lower side of the half shells and the sliding surface of the machine bed and not through the vacuum channels in the half shells. In this regard, the same applies to the cooling water, which must not escape—to a substantial extent—from between the lower side of the half shells and the slide surface of the machine table laterally of the molding path. When pipes of greater diameter ranges are to be made on apparatuses of the generic type, for instance pipes in a lower range of nominal diameters from 100 to 150 mm and in an upper range of nominal diameters of up to 400 mm, problems of leak-tightness between the under-sides of the half shells and the sliding surface of the machine bed arise in particular in the upper range of nominal width, leading to the specified drawbacks on the molding path.

Half shells for apparatuses for the manufacture of profiled plastic pipes are known from DE 197 00 028 A1, which are intended to be suitable also for extruders of great-diameter corrugated pipes. They have an indentation on their upper and lower side without any details being disclosed in this regard.

DE 43 18 514 C1 teaches an apparatus for the manufacture of profiled plastic pipes, in which two half shells are joined together on a molding path to form a mold; they are provided with indentations on their upper and lower side, each indentation engaging with a driving pinion. The known embodiment can only be used in so-called blow molding, in which air is blown at overpressure into the pipe that is to be produced. Problems of leak-tightness between the half shells and the machine bed do not occur.

We provide an apparatus of the generic type such that, even when half shells are used for the manufacture of pipes in the upper range of nominal width, there are no problems of leak-tightness between the lower sides of the half shells and the sliding surface of the machine bed, in particular in the area of the molding path.

The fact that it is possible to actuate the half shells that are designed for the manufacture of pipes of greater nominal diameter not only from above but also from below enables the half shells to be driven free from tilting on the molding path. This precludes any stress marks that might produce leaks to originate on the sliding surface of the machine bed. Only the half shells that serve for producing pipes of greater nominal diameters are actuated also from below, the half shells serving to produce pipes of smaller nominal diameters are only actuated from above.

Figure 2:
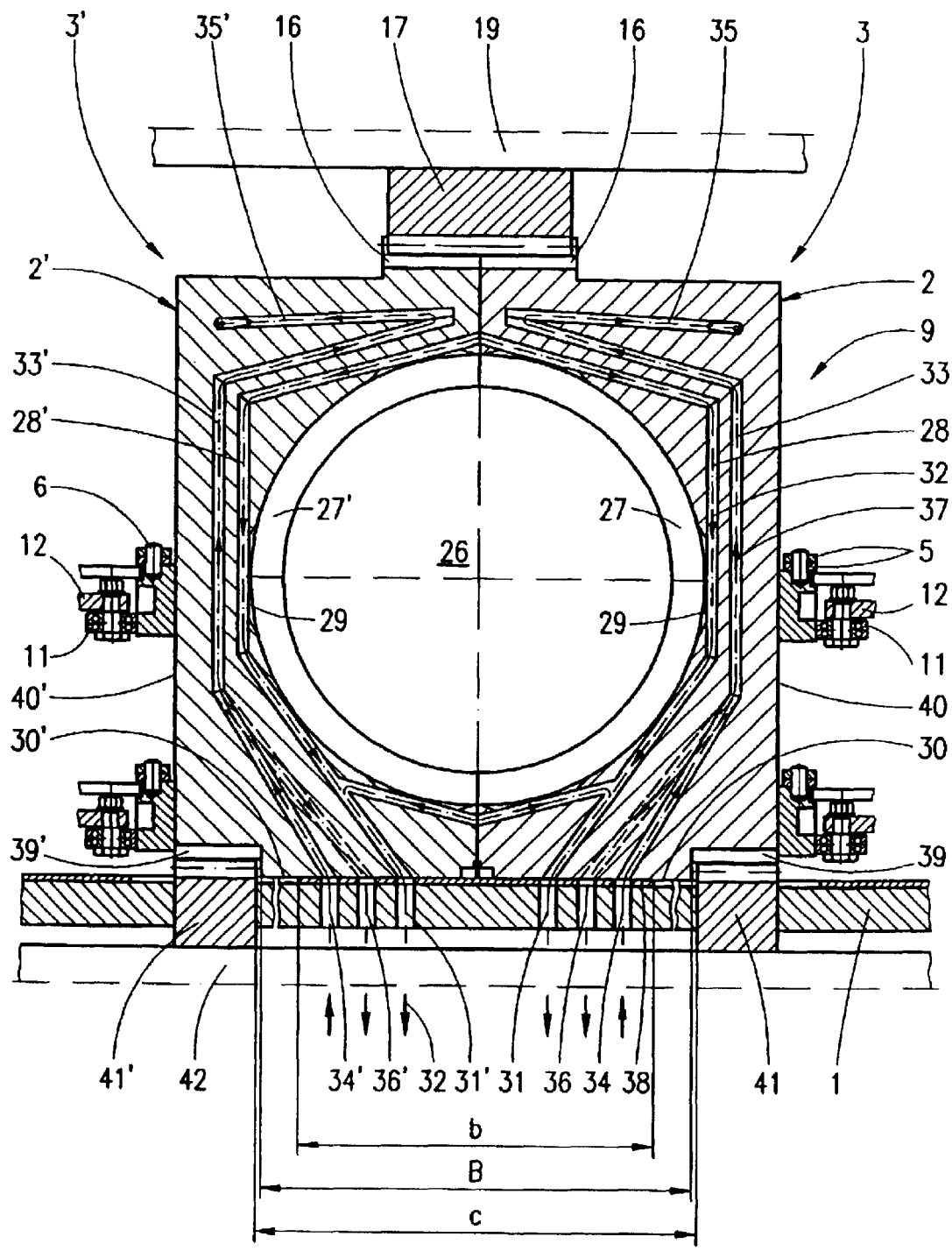
Figure 3:
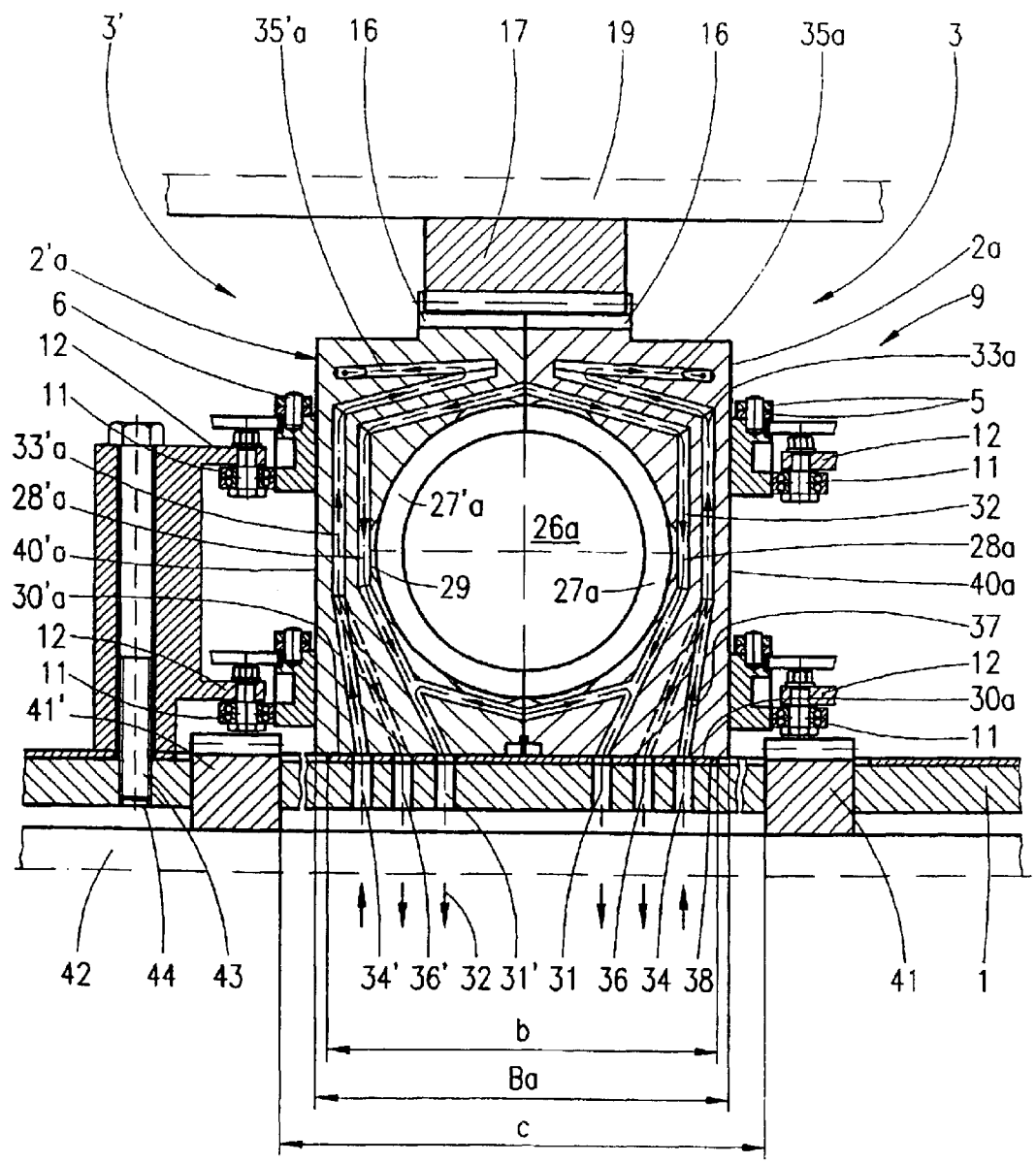

Further features, details and advantages of the invention will become apparent from the ensuing description of an exemplary embodiment, taken in conjunction with the drawing, in which FIG. 1 is a plan view of an apparatus for the manufacture of plastic pipes;

FIG. 2 is a cross-sectional view of the apparatus of FIG. 1 with half shells for the manufacture of plastic pipes of great nominal width; and FIG. 3 is a cross-sectional view of the apparatus of FIG. 1 with half shells for the manufacture of plastic pipes of smaller nominal width.

As seen in FIG. 1, an apparatus for the manufacture of plastic twin-wall pipes with cross grooves comprises a machine bed 1, on which half shells 2 and 2' are disposed, which are joined to each other, forming two so-called chains 3 and 3'. To this end, a bracket 5 is articulated by means of a pin 6 to each half shell 2 and 2' in the outward front portion thereof which leads in the direction of production 4; this bracket 5 is mounted on the succeeding half shell 2 in the corresponding place likewise by means of such a pin 6. By their rear end seen in the direction of production 4, the chains 3, 3' thus formed are guided along feed rollers 7 which serve as deflection wheels. Upon circulation of the chains 3, 3' in the direction of the arrows 8, 8', the individual half shells 2, 2' are moved into a molding path where two half shells 2, 2' are united to form a pair; pairs of shells which are successive in the direction of production 4 lie close together. For rapid closing of the half shells 2, 2' into a parallel and adjoining position, so-called closing rollers 10 are provided, which accelerate the joining of the rear ends—in the direction of production 4—of the half shells 2, 2'.

On the molding path 9 itself, the adjoining half shells 2, 2' are pressed against each other by means of guide rollers 11, which are rotatably mounted in guide rails 12 that can be adjusted horizontally and crosswise of the direction of production 4. The feed rollers 7 are mounted on the machine bed 1 for rotation about axle ends 13. At the front end, seen in the direction of production 4, of the machine bed 1, return rollers 14, which also serve as deflection wheels, are mounted for rotation about axle ends 15; the chains 3 and 3' are deflected by these return rollers 14 and guided back to the feed rollers 7. As seen in FIG. 1, the guide rails 12 with the guide rollers 11 terminate by the length of several half shells 2 and 2' before the return rollers 14 so that the half shells 2 and 2' can be moved apart parallel to each other and crosswise of the direction of production 4 prior to being deflected by the return rollers 14.

An indentation 16 is formed on the upper side of the half shells 2, 2', the two indentations 16 of the half shells 2, 2' which are allocated to each other in pairs being in alignment so that a joint driving pinion 17 can engage with this indentation 16 from above, pushing the half shells 2, 2' in the molding path 9 as a closed mold through the molding path 9. Actuation of this driving pinion 17 takes place in the usual way by a motor (not shown) via a driving gear 18 which is non-rotatably fixed on a shaft 19, the shaft 19 again carrying the driving pinion 17. The shaft 19 is run in a bearing 20 which is supported on the machine bed for height adjustment by way of spacers 21 and joined thereto by means of fasteners 22.

The apparatus illustrated serves for the manufacture of plastic pipes 23, namely so-called corrugated, twin-wall or gilled pipes, that have a cross-groove profile i.e., with grooves 24 encircling over the periphery thereof. An extruder is provided for the manufacture of the pipes 23, the pipe die 25 of which is roughly outlined; the pipe die 25 is the extrusion head of the extruder. Extruded from the pipe die 25 is a tube (not shown) which, while still in a thermoplastic condition, arrives in the mold on the molding path 9 where the cross-groove profile is formed. The apparatus described herein-before has been known for example from DE 196 40 928 A1 (corresponding to U.S. patent application Ser. No. 08/934,349 now U.S. Pat. No. 6,045,347). So-called twin-wall pipes can be produced in the same way by this apparatus, which are externally similar to the pipe 23 and which are internally provided with a continuous smooth pipe.

The half shells 2, 2', which are allocated to each other in pairs, are cooled on the molding path 9; moreover, molding the grooves 24 takes place by vacuum actuation of the mold cavity 26 formed on the molding path 9. The mold recesses 27, 27' provided in the half shells 2, 2' for formation of the mold cavity 26 have a shape complementary of the outer shape of the pipe 23. The half shells 2, 2' are provided with vacuum ducts 28, 28' that run in proximity to the wall of the mold recess 27 and 27', enclosing it at a comparatively small distance when the half shells 2, 2' adjoin by twos. Numerous vacuum slits 29 discharge from the vacuum ducts 28, 28' into the mold cavity 27, 27'. As seen in FIG. 2, the vacuum ducts 28, 28' are connected to each other when the half shells 2, 2' adjoin. The vacuum ducts 28, 28' open into the lower side 30, 30', resting of the machine bed 1, of the half shells 2, 2'. When the half shells 2, 2' adjoin in pairs, they overlap vacuum connections 31, 31' which are provided on the machine bed 1 and connected to a vacuum pump (not shown). The air flow in the vacuum ducts 28, 28' and vacuum connections 31, 31' is marked by the arrows 32.

Cooling channels 33, 33' are provided in the half shells 2, 2'; they are not connected with each other in the half shells 2, 2' that are allocated to each other in pairs. They start on the respective lower side 30, 30' of the corresponding half shell 2, 2' where they overlap cooling water flow lines 34, 34' in the machine bed 1 when the half shells 2, 2' adjoin. From there, the cooling channels 33, 33' pass at a distance around the respective mold recess 27, 27'. Provided below the indentation 16 are additional cooling channels 35 and 35' that are guided outwards. Seen in the direction of production 4, the cooling channels 33, 33' are disposed at a comparatively small distance from each other. Two cooling channels 33 and 33' neighboring in the direction of production 4 are connected with each other. With one cooling channel 33 and 33', respectively, being connected to the cooling water flow line 34 and 34', respectively, the ensuing cooling channel 33, 33' in the direction of production 4 may in this way be connected to a cooling water return line 36, 36' in the machine bed 1, as seen in particular in FIG. 2 left half. The cooling water flow direction is roughly outlined by the arrows 37. The vacuum and cooling water guidance are known for instance from DE 31 20 480 A1 (corresponding to U.S. Pat. No. 4,492,551).

An antifriction metal sliding plate 38 is arranged on the machine bed 1, consisting for example of brass. Brass has excellent antifriction properties towards steel and aluminum which the half shells 2, 2' consist of entirely or in part. The vacuum connections 31, 31', cooling water flow line 34, 34' and cooling water return lines 36, 36' pass through the sliding plate 38. It serves as a sliding surface for the half shells 2, 2'. The laterally outward area of the half shells seen in FIG. 2 is provided with a countersunk indentation 39, 39' that is open downwardly and directly adjoins the side walls 40, 40' of the half shells 2, 2'. Allocated thereto, lower driving pinions 41, 41' are provided on the machine bed 1, passing through the machine bed 1 and the sliding plate 38 and engaging with the indentations 39, 39'. The two driving pinions 41, 41' are disposed on a joint shaft 42 that is actuated via a transmission (not shown) by the same drive as the upper shaft 19. Actuation is such that the half shells 2, 2' are driven by the upper driving pinion 17 and the lower driving pinions 41, 41' at a speed that is absolutely identical.

The half shells seen in FIG. 3 are structured similarly to those of FIG. 2; however, they are distinctly smaller. While FIG. 2 illustrates the greatest possible half shells 2, 2' for molding pipes 23 of greatest possible diameters, FIG. 3 illustrates the half shells 2a and 2'a for molding pipes 23 of smallest possible diameters, which may be employed on one and the same machine. The components that are similar in FIG. 3, but differ in size, have the same reference numerals as in FIG. 2, however with a minuscule "a" added.

As seen in FIG. 3, the vacuum ducts 28a, 28'a and the cooling channels 33a, 33'a discharge on the lower side 30a, 30'a of the half shells 2a, 2'a in such a way that they overlap the vacuum connections 31, 31' of the cooling water flow lines 34, 34' and the cooling water return lines 36, 36'.

The width b of the sliding plate 38 that serves as a sliding surface is smaller than the clear span c of the two driving pinions 41, 41' from each other—as seen in FIGS. 2 and 3. The width b is further inferior to the total width B of the lower sides 30, 30' of the greatest possible half shells 2, 2' between the rear recesses that lodge the indentations 30, 30'. The width b of the sliding plate 38 is also slightly inferior to the total width Ba of the lower sides 30a, 30'a of the smallest possible half shells 2a, 2'a, namely from the side wall 40a to the side wall 40'a. The sliding plate 38 is always entirely covered by the half shells 2, 2' and 2a, 2'a so that, upon utilization of half shells 2, 2' and 2a, 2'a of varying dimensions, no stress marks can be produced that might affect the leak tightness between the sliding plate 38 and the lower side 30, 30' and 30a, 30'a.

When comparatively great half shells 2, 2' are used, they are driven from above by the driving pinion 17 and from below by the driving pinion 41, 41' so that actuation free from tilting is ensured. This is not necessary for the use of smaller half shells 2a, 2'a; they are only actuated by the upper driving pinion 17.

Of course, the above measures may not only by used in an apparatus in which the half shells 2, 2' and 2a, 2'a are joined to each other by brackets 5, forming so-called chains 3, 3'; they can also be used in apparatuses in which the individual half shells are transported individually and which are equipped as in an apparatus according to EP 0 764 516 A (corresponding to U.S. Pat. No. 5,693,347).

FIGS. 1 and 3 also illustrate how the guide rails 12 are horizontally adjustable crosswise of the direction of production 4 so that the molding path 9 may be regulated for varying widths of half shells 2, 2' and 2a, 2'a. The guide rails 12 can be fixed to the machine bed 1 by means of screws 43, to which end several rows of threaded holes 44 are provided in the machine bed 1 crosswise of the direction of production 4. Each row of threaded holes 44 corresponds to a certain width of a half shell 2, 2' and 2a, 2'a.

What is claimed is:

1. An apparatus for the manufacture of profiled plastic pipes, comprising
    a machine bed (1),
        which has a sliding surface (38) of a width b;
    half shells (2, 2'; 2a, 2'a), each of which having
        a lower side (30, 30'; 30a, 30'a), by which they are guided on the machine bed (1), an upper side with an upper indentation (16),
a side wall (40, 40', 40a, 40'a),
a mold recess (27, 27'), and being provided
with vacuum ducts (28, 28'; 28a, 28'a), which open into the respective mold recess (27, 27'), and
with cooling channels (33, 33'; 33a, 33'a);

a molding path (9),
which runs in a direction of production (4) and
on which the half shells (2, 2'; 2a, 2'a) mate together in pairs to form a mold;

guides (12), which are adjustable horizontally and transversely to the direction of production (4) and act on the side walls (40, 40'; 40a, 40'a), pressing the half shells (2, 2'; 2a, 2'a) together in pairs on the molding path (9);

a pipe die (25) upstream of the molding path (9) in the direction of production (4);

vacuum connections (31, 31'), which are formed in the molding path (9) on the machine bed (1), passing through the sliding surface (38) and opening into the vacuum ducts (28, 28'; 28a, 28'a);

cooling water flow lines (34, 34'), which are formed in the molding path (9) on the machine bed (1), passing through the sliding surface (38), and cooling water return lines (34, 34'), which pass through the sliding surface (38) and open into the cooling channels (33, 33'; 33a, 33'a); and at least one upper driving pinion (17), which is disposed above the molding path (9) and engages with the upper indentation (16) on the upper side of the half shells (2, 2'; 2a, 2'a), in the direction of production (4) advancing the half shells (2, 2'; 2a, 2'a) which mate together on the molding path (9) to form a mold;

characterized in that two lower driving pinions (41, 41') are provided on the machine bed (1) along the molding path (9) crosswise of the direction of production (4) and at a distance c from each other; and in that a first set of half shells (2, 2') and a second set of half shells (2a, 2'a) are provided, which are to be arranged optionally on the machine bed (1), and of which the half shells (2, 2') of the first set, between the side walls (40, 40') and the lower side (30, 30'), have greater mold recesses (27) than the mold recesses (27') of the second set and are provided with a lower indentation (39, 39') which a lower driving pinion (41, 41') engages with, and of which the half shells (2', 2'a) of the second set are free from indentations.

2. A apparatus according to claim 1, characterized in that two lower driving pinions (41, 41') are in alignment.

3. An apparatus according to claim 1, characterized in that the two lower driving pinions (41, 41') pass through the machine bed (1).

4. An apparatus according to claim 3, characterized in that $b \leq B$ and $b \leq Ba$ applies to the width b of the sliding surface (38) between the lower driving pinions (41, 41') as compared to the total width B of the lower sides (30, 30') of the half shells (2, 2') of the first set of half shells (2, 2') which mate together in pairs to form a mold, and to the total width Ba of the lower sides (30a, 30'a) of the half shells (2a, 2'a) which mate together in pairs to form a mold.

5. An apparatus according to claim 3, characterized in that $b<c$ applies to the width b of the sliding surface (38) on the molding path (9) as compared to the distance c of the lower driving pinions (41, 41') from each other.

6. An apparatus according to claim 1, characterized in that the sliding surface is a sliding plate (38) mounted on the machine bed (1).

* * * * *